Aug. 20, 1935.　　　　G. T. BALFE　　　　2,011,563
GASKET
Original Filed Sept. 15, 1930
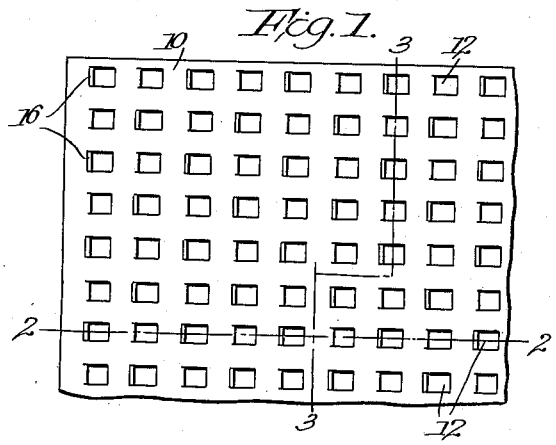
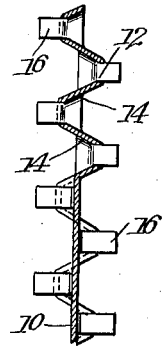
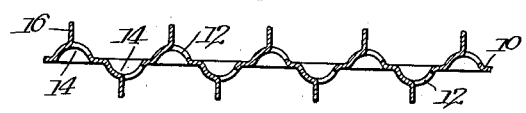
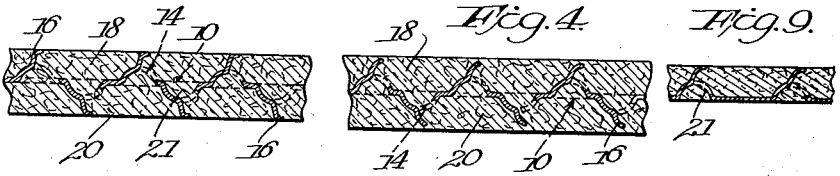
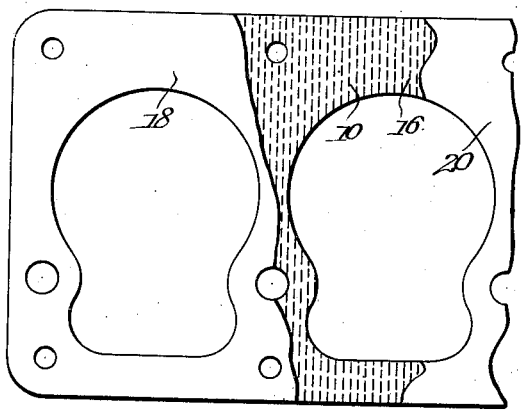
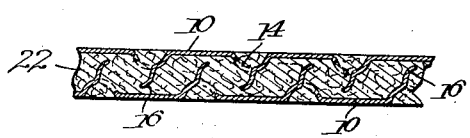
Inventor
George T. Balfe
By Cushman Darby & Cushman
Attorneys Patented Aug. 20, 1935

2,011,563

UNITED STATES PATENT OFFICE 2,011,563

GASKET

George T. Balfe, Detroit, Mich., assignor to Detroit Gasket & Mfg. Co., Detroit, Mich., a corporation of Michigan Original application September 15, 1930, Serial No. 482,098. Divided and this application October 31, 1933, Serial No. 696,097

7 Claims. (Cl. 154—2)

My invention relates to gaskets and has particular reference to a type of gasket primarily designed for use where high pressures must be withstood and a tight seal maintained.

An object of my invention is to greatly increase the efficiency, lengthen the use and the life, and in general improve a gasket structure similar to that described and claimed in my copending applications Serial No. 420,331, filed January 13, 1930, Patent 1,776,140, September 16, 1930, and Serial No. 482,098, filed September 15, 1930, of which this application is a division.

More specifically the object of my invention is to so construct and shape a reinforcing element which is embedded in any suitable gasket material that it will form a more binding union between the two and will form a barrier tending to resist breakage or blowouts through the gasket material. As is well known, there is a tendency for gaskets, particularly when they are subjected to high temperatures and pressures at the same time, to burn, break, or tear at some points. Such burning or tearing heretofore has marked the end of the useful functions of the gasket because the union, or cohesion of the gasket as a unit has been insufficient to prevent the spreading of this tear.

An object of the invention is to provide a gasket which offers throughout its thickness a multiplicity of successive metal barriers to the heat and pressure which cause blowing of the gasket.

Through the use of a reinforcing plate having protruding tongue portions minutely spaced apart on each side thereof, which are embedded in suitable compressible gasket material, a large series of barriers is erected throughout the area of the gasket to withstand any tendency of an initial burn or tear to spread further through the gasket. Also, by greatly increasing the cohesion between my reinforcing element and the gasket material I have assisted in minimizing the tendency to break and prevent the spreading thereof should it occur.

This tendency of an initial break or tear to spread through the gasket applies particularly to gaskets used in combustion engines, where the various points which are subject to heat and pressure are located in close proximity to one another.

A further object of the invention is to provide a gasket having a multiplicity of metal conduits throughout its area whereby the heat generated at the contact surfaces of the joint is dissipated.

The present application is directed to the method of manufacturing a gasket as described in my aforesaid patent and application.

That is to say, the metal sheet is formed with a multiplicity of closely compacted projections in the form of protuberances and tangs extending beyond the apices thereof, and there is applied to one or both sides of the metal sheet a layer of cushion material such as asbestos. In uniting the layers, the length of the projections above the plane of the metal sheet and the pressure employed are correlated so that the tangs extend to the surface of the cushion layer and are bent over to lie within the plane of the outer surface thereof. That is, the bent over or deformed ends of the tangs do not extend above the surface of the cushion layer, but rather lie within the same, as stated, so that a smooth gasket surface is presented to the contact areas, of the joint. Further the method comprises compacting or embedding the cushion material into the cup-like projections or pockets of the protuberances and the openings defined by the struck-up portions of the tangs, so that the openings are sealed and the cushion material is additionally held in position by its engagement in said pockets.

It is particularly to be noted that layers of the cushion material of substantially uniform thickness are applied to one or both sides of the layer of metal insert material and the combining of the layers, notwithstanding the presence of protuberances and tangs is such that the contact surfaces of the gasket are smooth and unobstructed. That is, the protuberances and tangs are embedded within the cushion layers and the cushion material is embedded in the protuberances and openings. No substantial deformation of the protuberances takes place, the walls of the same being of very minute dimension, and the pressure is exerted upon the cushion material to compact and force the same to accommodate itself to the metal sheet, whence a gasket of uniform thickness having smooth contact surfaces is obtained.

Still other objects and meritorious features of my invention will become apparent from the following description taken in conjunction with the drawing wherein like numerals refer to like parts throughout the several figures and wherein:

Figure 1 is a plan view of my reinforcing element;

Figure 2 is a section taken on the line 2—2 of Figure 1;

Figure 3 is a section taken on the line 3—3 of Figure 1;

Figure 4 is a section through my coupled gasket, illustrating the manner in which my reinforcing element is embedded between layers of gasket material;

Figure 5 is a plan view, partly broken away, of a gasket used in the cylinder head of a combustion engine;

Figure 6 is a somewhat modified arrangement of my gasket structure;

Figure 7 illustrates another modified assembly;

Figure 8 is a sectional view of an insert or reinforcement having the protuberances formed from one side only, and Figure 9 is a sectional view showing the cushion layer applied to the material of Figure 8.

My reinforcing element comprises a thin sheet of reinforcing material 10, preferably of sheet steel. My reinforcing sheet is provided with horizontal and vertical rows of apertures 12. These apertures may be spaced equally from each other both horizontally and vertically, and are formed with a punch machine which need not be described herein, but fashions the punch apertures in a manner hereafter to be described.

These apertures are closely compacted and punches enter the sheet 10 from opposite directions to form alternating apertures extending in opposite directions. The result of this alternate punching is clearly illustrated in Figs. 2 and 3 where alternate apertures are shown extending in opposite directions. In the direction in which the punch enters a crater-like depression 14 or cup is formed. This cup forms an oppositely directed protuberance. This protuberance includes a small tongue 16 extending away laterally from the plane of the reinforcing element 10. The spacing between each of the apertures or cup-like depressions or protuberances in my element 10 is somewhat exaggerated in the drawing for the purpose of more clearly illustrating the precise structure resulting from the punch but they are closely compacted and preferably arranged in staggered rows. The portion marked 14, constituting the crater-like protuberance or cup shaped depression is minute, but necessarily results in the initial contact of my punch with the sheet material of the reinforcing element. The tang 16 is also relatively small but projects beyond the protuberance 14.

This reinforcing element is shown in Figs. 4 and 7 as embedded between two layers 18 and 20 of suitable gasket material, which may be felt, asbestos, or any desired packing substance. This embedding operation is accomplished by compressing the two layers 18 and 20 toward one another after having inserted the reinforcing element 10 therebetween.

The tongue 16 is of a deformable nature, and when subjected to pressure will deform in the manner indicated in Figs. 4 and 7 to constitute a clamp or hook. In this way, the protuberances 14, as well as the deformed tongue extensions 16, will function for form barriers and a more cohesive binding, gasket unit than has hitherto been available.

A feature of importance is that the packing material is compacted or forced into the crater-like apertures 14 as shown at 21 in Figures 4, 7 and 9, one layer on one side of the perforated metal sheet and the other layer on the other side thereof and thereby forms a much more perfect joint. The protuberances which form the craters or apertures are staggered and together with the tongues form barriers in the packing layers which obstruct the blowing through of the packing material.

The portions 21, as shown, seal the openings 12 and in the case of the structures shown in Figures 4 and 7, the cushion material is continuous through said openings and fills the craters 14. The same result obtains with the structure shown in Figure 9.

The uniform thickness of my gasket structure eliminates the necessity of excess pressure around the openings thereof, which the double thickness around the edges of the customary copper gasket requires for the purpose of sealing the joint properly.

Referring to Figures 7 and 9, the tongue portions 16 extend entirely through the packing layers and the ends of the tongues are clenched down and embedded within the surface of each cushion layer as shown, to produce an unobstructed surface. This structure may be produced by using relatively narrow layers of packing material or increasing the length of tongues 16.

As shown in Figs. 7 and 9, the projections on one or each side of the metal layer are closely associated or compacted. These tongue-like projections are embedded in the cushion layer until the ends of the same project therethrough substantially to the surfaces of the cushion material, whereupon the ends of the projections are clenched over on the cushion material by bending the same under pressure. In this manner, the exposed surfaces of the gasket are substantially smooth and the projections do not extend thereabove.

Furthermore, it is obvious that if a very stiff reinforcing sheet material is used, there need be no deformation, or clenching over of the upper portions of tongue 16 when the layers of gasket material are compressed thereon. The tongues 16 will then retain the position illustrated in Fig. 2 when embedded.

In Fig. 6, I have illustrated a possible modification of my gasket assembly, wherein a single layer 22 of packing material only is utilized and a reinforcing element 10 embedded therein on opposite sides thereof.

The walls of the depressions provide a large and rapid conductive surface terminating in tangs which penetrate deeper into the gasket material. Thus, the heat is conducted interiorly of the gasket away from the surfaces thereof and dissipated at spaced points throughout the thickness of the gasket.

Due to the fact that the outer surfaces of my gasket are composed of packing material and compressible, it may be utilized to seal joints between somewhat roughened or uneven elements. Accordingly, I contemplate its use between surfaces which are uneven, warped, or which have not been machined.

The several types of gasket materials illustrated are produced in sheet form and the gaskets of suitable shape and contour punched therefrom.

It is to be observed that the pojections are struck-up in the metal sheet upon one side shown in Fig. 8, or upon both sides as shown in Fig. 2, and that these projections extend throughout the area of the metal sheet or layer as shown in Fig. 1, in closely compacted relation. Moreover, it is to be observed that the tongue-like projections are all bent in the same direction, to overlie the openings formed in the metal layer by striking up the metal therefrom.

In carrying out the method of the invention, the layers or layer of cushion material such as asbestos are combined with the layer of metal insert material shown in Figures 2 or 8 by compressing the respective layers upon the opposite sides thereof to form the structure shown in Figures 4, 7 and 9. Preferably, the pressure is such as to cause the tangs 16 to extend to the surface of the cushion layers where their ends are bent over and then pressed within the plane of the cushion layers so that a smooth continuous contact surface is presented as shown in Figures 7 and 9. At the same time, as illustrated, the cushion material is forced or compacted into the craters 16 as shown at 21 to additionally hold the cushion material in position and present smooth contact surfaces of particular importance, the openings defined by the craters and the struck-up portions or tangs are thereby sealed so that the gasket is leak-proof. It is important therefore that the pressure be such as to (1) embed the protuberances and tangs within the cushion layers and deform the tangs as shown in Figures 7 and 9 so that a smooth gasket surface is provided, and (2) that the cushion material be distributed in compact condition within the craters and the openings defined thereby to form a thorough seal from one surface of the gasket to the other. Stated briefly, in the construction shown in Figure 7, for example, the cushion layers are substantially continuous at the portions defined by the openings in the metal sheet.

It is to be understood in some cases as shown in Figure 9 that the gasket will comprise a single layer of metal and a single layer of cushion material. In such a case the cushion layer will be combined with the metal layer in the manner illustrated in Figure 9, the protuberances and tangs being embedded in the cushion layer as shown in Figure 7 and the asbestos material being forced through the openings 12 in the protuberances so as to have portions of the cushion layer extend to the surface of the metal layer. In this manner the openings through the metal layer are fully sealed and in addition portions of the cushion layer extending through the openings 12 act to additionally bind the cushion layer to the insert layer and form a smooth surface.

I claim:

1. The method of making a gasket for internal combustion engines which comprises striking out a plurality of closely associated tongue-like projections throughout the two sides of a layer of sheet metal, combining coextensive layers of cushion gasket material with opposite sides of said layer of sheet metal by compressing the three layers together, embedding the projections in said cushion material until the ends of the same project therethrough, clenching the ends of the projections on the cushion material by bending the same and embedding the bent ends within the plane of the surface of the cushion material, thereby forming a gasket having substantially smooth cushion surfaces having bent metallic tongues embedded therein, and embedding the cushion material in the openings defined by the struck-up portions to seal said openings.

2. The method of making a gasket for internal combustion engines which comprises striking out a plurality of closely associated tongue-like projections throughout one side of a layer of sheet metal, disposing a coextensive layer of cushion gasket material on the side of said sheet having the projections extending therefrom and compressing the layers together, embedding the projections in said cushion layer until the ends of the same project therethrough, substantially to the surfaces of the cushion material, clenching the ends of the projections on the cushion material by bending the same and embedding said bent ends within the plane of the cushion material, thereby forming a gasket having substantially smooth cushion surfaces having bent metallic tongues embedded therein, and embedding the cushion material in the openings defined by the struck-up portions to seal said openings.

3. The method of making a gasket for internal combustion engines which comprises striking out throughout both sides of a layer of sheet metal a plurality of closely associated projections each comprising a protuberance and a tang extending from the apex of the protuberance, combining coextensive layers of cushion material with opposite sides of said layer of sheet metal by compressing the layers together, embedding the protuberances and tangs in said cushion material until the ends of the tangs project beyond the surfaces of the cushion material, bending the ends of the tangs so that they overlie the cushion material and embedding the bent ends within the plane of the surfaces of the cushion material thereby forming a gasket having substantially smooth cushion surfaces having bent metallic tongues embedded therein, and embedding the cushion material in said protuberances and the openings therein to completely seal said openings and form a continuous cushion material layer through said openings and protuberances.

4. The method of making a gasket for internal combustion engines which comprises striking out throughout one side of a layer of sheet metal a plurality of closely associated projections each comprising a protuberance and a tang extending from the apex of the protuberance, combining a coextensive layer of cushion material with said side of the layer of sheet metal by compressing the layers together, embedding the protuberances and tangs in said cushion material until the ends of the tangs project beyond the surface of the cushion material, bending the ends of the tangs so that they overlie the cushion material and embedding the bent ends within the plane of the surface of the cushion material thereby forming a gasket having a substantially smooth cushion surface having bent metallic tongues embedded therein, and embedding the cushion material in said protuberances and the openings therein to completely seal said openings.

5. The method of making a gasket for internal combustion engines which comprises interposing between sheet-like layers of cushion gasket material a coextensive layer of sheet metal having throughout the same closely compacted tongue-like projections struck therefrom and extending from each face thereof, the projections being of sufficient length to extend through the cushion layers substantially to the surfaces thereof, compressing the cushion layers toward one another with the metal layer therebetween and embedding the projections in the cushion layers until the ends of the projections extend substantially to the surfaces of the cushion layers, and deforming the projections by bending the ends thereof to clench the same on the cushion material and embed the ends within the cushion material to provide substantially smooth cushion surfaces, and embedding the cushion material in the openings defined by said tongue-like projections to completely seal said openings.

6. The method of making a gasket for internal combustion engines which comprises interposing between sheet-like layers of cushion gasket material a coextensive layer of sheet metal having throughout the same closely compacted tongue-like projections struck therefrom and extending from each face thereof, the projections being of sufficient length to extend through the cushion layers beyond the surfaces thereof, compressing the cushion layers toward one another with the metal layer therebetween and embedding the projections in the cushion layers until the ends of the projections extend to the surfaces of the cushion layers, and deforming the projections by bending the ends thereof to clench the same on the cushion material and embed the ends within the cushion material to provide substantially smooth cushion surfaces, and embedding the cushion material in the openings defined by said tongue-like projections to completely seal said openings.

7. The method of making a gasket for internal combustion engines which comprises striking out a plurality of closely associated tongue-like projections throughout one side of a layer of sheet metal, combining a coextensive layer of cushion gasket material with the struck-up side of said layer of sheet metal by compressing the two layers together, embedding the projections in said cushion material until the ends of the same project therethrough, clenching the ends of the projections on the cushion material by bending the same and embedding the bent ends within the plane of the surface of the cushion material, thereby forming a gasket having a substantially smooth cushion surface having bent metallic tongues embedded therein, and embedding the cushion material in the openings defined by the struck-up portions to seal said openings and thereby providing a perforate metal surface for the gasket having cushion material in the openings thereof.

GEORGE T. BALFE.